March 24, 1970 J. MEIER 3,501,808
PRESS MOLDING DEVICE AND METHOD
Filed Sept. 6, 1966 5 Sheets-Sheet 1

INVENTOR.
JOSEPH MEIER
BY
McGlew & Toren
ATTORNEYS.

INVENTOR.
JOSEPH MEIER

INVENTOR.
JOSEPH MEIER

March 24, 1970 — J. MEIER — 3,501,808
PRESS MOLDING DEVICE AND METHOD
Filed Sept. 6, 1966 — 5 Sheets-Sheet 5

INVENTOR.
JOSEPH MEIER
BY McGlew & Toren
ATTORNEYS.

3,501,808
PRESS MOLDING DEVICE AND METHOD
Joseph Meier, Geroldswil, Switzerland, assignor to Schweizerische Industrie-Gesellschaft, Neuhausen am Rheinfall, Switzerland
Filed Sept. 6, 1966, Ser. No. 582,192
Claims priority, application Switzerland, Sept. 3, 1965, 12,425/65
Int. Cl. B29c 17/00
U.S. Cl. 18—19                          7 Claims

ABSTRACT OF THE DISCLOSURE

This invention relates, in general, to a device for press molding materials and, in particular, to a new and useful device for producing hollow bodies from synthetic thermoplastic foil using a swage plate.

---

At the present time in order to form hollow products from thermoplastic foil, it is usual to clamp the edge of the foil sheet, for instance, between the lower mold and a fixer upper box before the predrawing punch is permitted to enter into the mold and to form the hollow body of the foil material which is disposed over the mold cavity. With such a method the foil is clamped all around the cavity or cavities of the mold before the drawing process begins so that a large portion of the foil material is excluded from this drawing process by the clamping action. The consequence is poor utilization of the foil material and irregular flow of the material into the wall of the hollow body to be molded.

It is also known in multiple positive molding processes of hollow bodies to employ a hold down frame cooperating with the positive mold. To avoid the formation of folds in the rim area of the hollow body, this hold down frame must be adapted to the positive mold and its working position must rest closely against the positive mold. While this makes it possible to achieve approximately uniform material flow from the plane of the foil into the hollow body, this material flow is usually insufficient due to the necessary contact of the foil with the hold down frame directly at the positive mold with the corresponding frictional engagement leading to thick rim flanges of the hollow bodies and especially where deep hollow bodies are concerned or to very thin walled bodies.

In accordance with the present invention, there is provided a method and means for producing hollow bodies from synthetic thermoplastic foil in strip or sheet form which permits the formation of uniform walls of the hollow bodies without the resultant disadvantages of the prior art method and equipment. In accordance with the present invention, a swage plate is arranged so that it may be positioned to encompass an area spaced from the rim of the cavity to be formed. The equipment for accomplishing this is arranged to bring the swage plate into and out of its working position independently of the operation of the hollow mold and the punch. The swage plate is such that its working area will be located adjacent the rim area of the hollow mold, but the holding contact will be made over an area at least slightly smaller than the rim area. The swage plate provides for the controlled braking of that portion of the foil surrounding the cavity of the hollow mold before the mold touches the foil and before the punch enters the cavity.

In the preferred arrangement, the swage plate is made to cooperate with a fixed box as a counter support. In some instances, where such a fixed box is not available, a special clamping frame is, of course, required, but the drawing of the foil material in the area of the cavity of the hollow mold is not determined by the clamping frame, but by the outline of the openings of the swage plate. To each cavity can be assigned, besides a swage plate on the hollow mold side, a counter support on the punch side which cooperates with the swage plate in the manner of a fixed box part or of an individual movable swage plate. In such latter event, a special clamping frame is not required.

A further object of the invention is to provide a device for forming hollow bodies from a thermoplastic material which includes a swage plate which surrounds the cavity of a hollow mold but which has a celarance in respect thereto, with means for bringing the swage plate into and out of a working position in respect to the hollow mold in order to contact the foil disposed therearound for the controlled braking of the foil surrounding the cavity at its spaced location from the edge thereof before the mold touches the foil and the punch enters the cavity.

A further object of the invention is to provide a device for forming hollow bodies from thermoplastic material which includes a swage plate which may be moved against a fixed box member in order to clamp the foil material between a punch member and a mold member forming a hollow cavity in alignment with the punch member, with means for displacing the mold member with the cavity and the punch member toward each other to cause engagement of the foil material first by the punch and thereafter and movement of the foil material into the cavity by the punch member while the foil material is being clamped between such swage plate and said fixed box.

A further object of the invention is to provide a device for forming hollow bodies from thermoplastic material which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 5A:
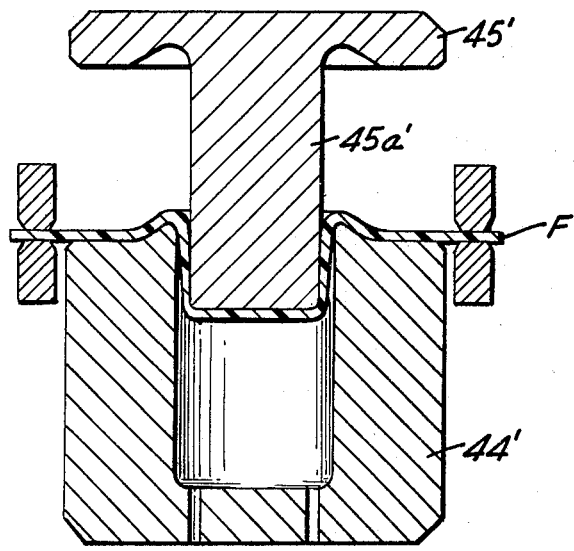
FIG. 5a is an enlarged partial sectional view of the mold cavity member and punch indicated in FIG. 4.
Figure 5B:
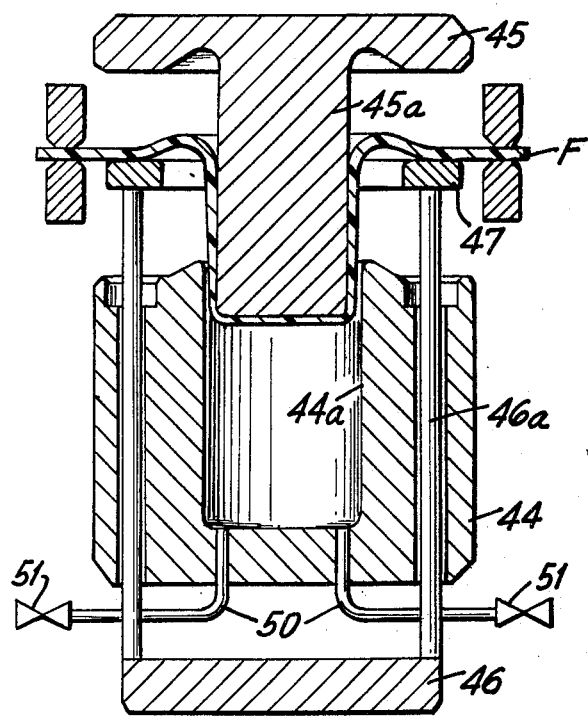

FIG. 5b is a view similar to FIG. 5a of another embodiment of the invention; and FIGS. 6a and 6b and 7a and 7b indicate partial enlarged sectional views of the mold cavity and die showing the formation of the containers of the prior art and those of the present invention, respectively.

Figure 1:
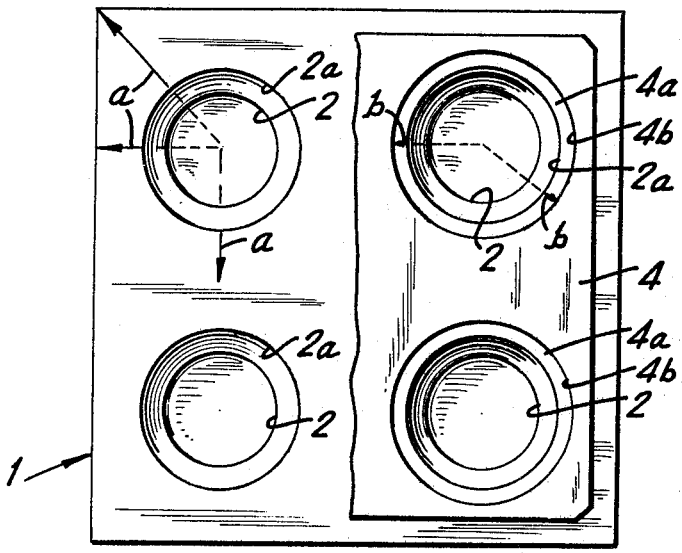
FIG. 1 is a top plan view of a mold cavity with a portion thereof indicated as having a swage plate or holding ring as constructed in accordance with the invention.

Referring to the drawings, in particular, the invention embodied therein as indicated in FIG. 1, includes a mold member, generally designated 1, having a plurality of mold cavities 2 which are adapted to cooperate with a punch (not shown) which will move into the cavities 2 and form a hollow body from a foil material which is placed between the punch and the mold member 1. Prior to the present invention, it was usual to position a foil over the mold member 1 and to clamp the foil over the complete area of the top surface 3 which is located outside the ring or rim 2a defining the exterior of the cavity 2. Because the foil was subjected to the quenching and clamping effect at a location beginning at the ring 2a, the foil material could not easily be drawn into the cavity 2 by the action of the punch.

In accordance with the present invention, there is provided a swage plate or grill plate 4, which is provided openings 4a, which are concentric to the cavities 2, but which include rims 4b which are spaced outwardly from the rims 2a defined by the cavities 2. The mold plate 4 is movable into its working position independently of and prior to the mold member 1 so that before the mold member closes, the foil material is clamped at a location spaced outwardly from the ring 2a by the amount indicated b to permit the uniform drawing in of the foil material over the whole area including this surrounding area b so that the foil can be predrawn prior to closing of the mold with the foil plate 4 serving as a foil support.

Thus, with the use of the grill 4, there is no likelihood that the hollow body which is to be formed will be formed with uneven areas because of the differences in the draw of the foil material which would provide the acting forces a, as indicated to the left hand portion of FIG. 1.

Figure 2:
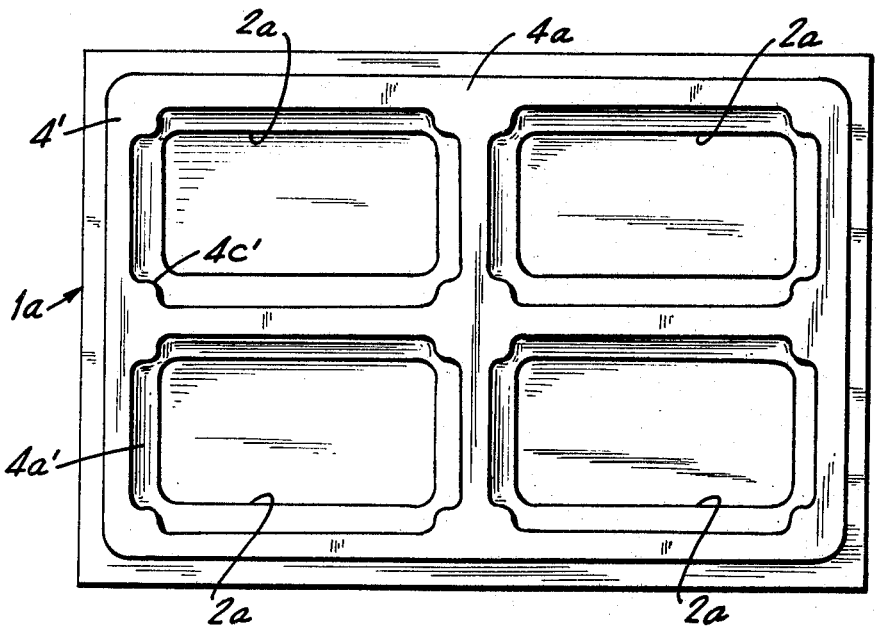
FIG. 2 is a top plan view similar to FIG. 1 of another embodiment of the invention.

As indicated in FIG. 1, the openings 4a of the grill 4 are made circular when the circular cavities 2 are provided in the mold member 1. When a mold member 1a of the type indicated in FIG. 2 is employed, having substantially rectangular cavities 2a, then openings 4a' of the configuration indicated are provided in the grill plate 4'. Because there is a tendency for too much material to flow together at the corners of a rectangular mold cavity configuration, the grill plate 4' is provided with inwardly-shaped corners 4c' as indicated in FIG. 2. This causes a reduction at the corners of the cavities of the width of the freely drawable foil material.

Figure 3:
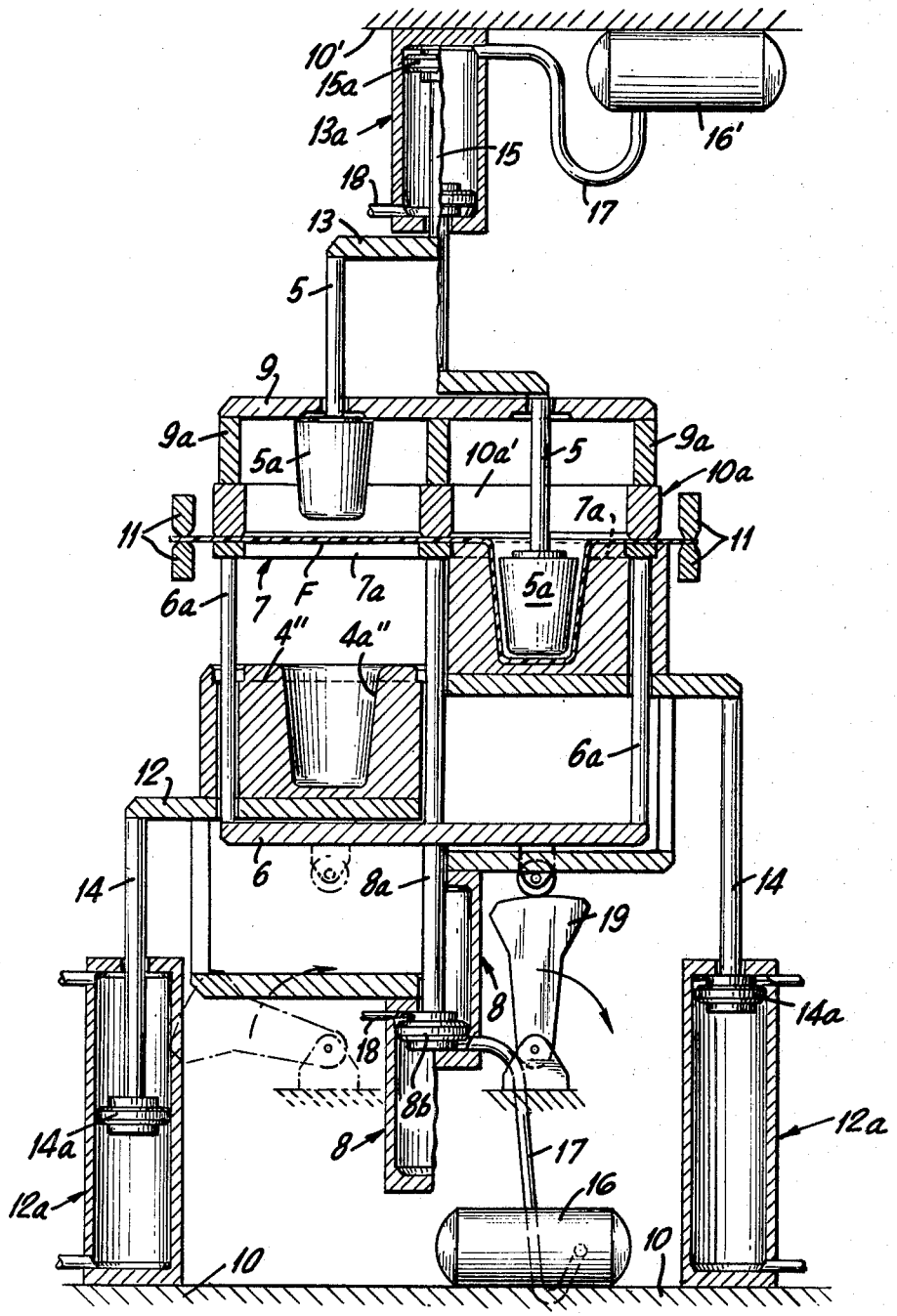
FIG. 3 is a schematic vertical sectional view of a machine for producing hollow bodies from synthetic plastic foil constructed in accordance with the invention and showing on the left and right half portions illustrated, the various end operating positions of the various parts.

As indicated in FIG. 3, there is shown an apparatus for employing the swage plate for forming hollow bodies in accordance with the invention. The apparatus includes fixed frame members 10 and 10' which support a lower tool table 12 and an upper tool table 13. The tables 12 and 13 are mounted for displaceable movement in a vertical direction on associated supporting fluid cylinders 12a and 13a, respectively. The table 12 is supported on respective rod members 14 connected to pistons 14a which slide in its associated cylinders 12a. The table 13 is connected to a piston rod member 15 which is associated with a piston 15a which is slidable in the cylinder 13a. Suitable fluid control means such as a compressed air supply 16 and 16' are provided for energizing the respective opposite sides of the associated pistons through connections designated 17 and 18.

A multiple cavity mold member 4" having an appropriate number of cavities 4a" is secured to the lower tool table 12. A punch member 5a is carried at the end of a rod member 5 which is carried on the table 13. The punch member 5a and the cavities 4a" are such that slightly conical container of rounded cross section and flat rim flange are formed.

In accordance with the invention, a swage or grill plate grill plate 7 is mounted in rod elements 6a, 6a of a carrier plate or table 6. The grill plate 7 is provided with openings 7a coaxial to the cavities 4a" of the hollow mold member 4" so that the grill plate 7 encompasses said cavities but with radial clearance. The carrier plate 6 is supported on rods 8a having piston portions 8b which are slidable in a fluid cylinder 8 so that the grill 7 can be moved vertically independently of the tool table 12.

At the upper side of the foil plane, there is located a stationary box 10a with a carrying plate 9 and carriers 9a, 9a. The carrier plate 9 is penetrated by the arms 5 holding the punches 5a. The openings in the holding plate 10a' are substantially cylindrical and are disposed coaxial to the holes in the lower grill plate 7 and have the same diameter as such holes.

A two-part drawing frame 11 is arranged for operation independently of the swage or grill plate 7 to retain the synthetic thermoplastic foil F at the molding station. Such a drawing frame 11 is not absolutely essential and could be eliminated.

In operating the device, indicated in FIG. 3, the hollow mold 4" and the punch 5a are initially disposed in the operating position indicated at the left hand portion of FIG. 3. The foil F is held at the molding station by its edges in the drawing frame 11 and lies under the fixed box 10a at a distance from the hollow mold 4" and the punch 5a. The grill plate 7 is first moved vertically up until it rests against the foil F pushing the latter lightly against the plate 10a' of the fixed box 10a, as shown at the left of FIG. 3. This holds the foil relatively closely to the rim portion surrounding the foil portions to be deformed. Then the punches 5a are lowered to draw the foil as the hollow mold member 4" is raised by actuation of their associated fluid cylinders 13a and 12a, respectively. This movement continues until the punches are in the end position within the cavity as indicated to the right of FIG. 3. In some instances, means (not shown) are provided for generating an over or under pressure in the cavities in order to favor the satisfactory deformation, of the foil.

In prior art molding equipment, without the supporting swage plate 7, that is, without fixing the immediate edge of the foil portion to be deformed, the hollow mold must be raised prior to lowering the punches until it makes contact with the foil so that this rim portion experiences a certain quenching and severe braking. This is not necessary with the equipment indicated in FIG. 3, because the swage plate in conjunction with the holding plate 10a' fixes the foil and therefore the punch can push against the foil before the hollow mold is up. This results in a preddrawing effect. In this manner, the additional annular area of foil material flows into the container while less material becomes waste.

Uniform drawing conditions in the foil material result over the entire circumference of the container to result in a more uniform rim portion of the container. Fixing the foil directly adjacent the rim portion of the container between the swage plate and the fixed box 10a results also in a relatively severe drawing of the container rim. Therefore, it comes out thin and can be, when required, rolled in much easier than heretofore. During the subsequent removal from the mold member 4", the swage or grill plate 7 can also serve to support the foil while the molded containers are being ejected from the cavities. For this purpose, the swage plate remains in its working position while the hollow mold member 4" and the punch 5a are being moved apart.

In combination with an ejector (now shown) which serves as a bottom for the container, removal from the mold is thus possible without mechanical stresses on the still relatively soft molded part. This makes it possible to produce very thin bodies, for example, cigarette packages or bodies with certain reverse draft such as with a restricted neck or with embossed sides and to remove them from the mold without danger of breaking.

In order to maintain the swage plate 7 in the upper most position when the hollow mold member 4" is lowered, it is necessary to provide for a mechanical locking system for the grill which is effective at least in the first phase of removal from the mold. This can be done as indicating in FIG. 3, by pivoted cam 19 which supports the grill during the critical phase and then swings away into an ineffective positon when the grill plate 7 may be lowered.

Figure 4:
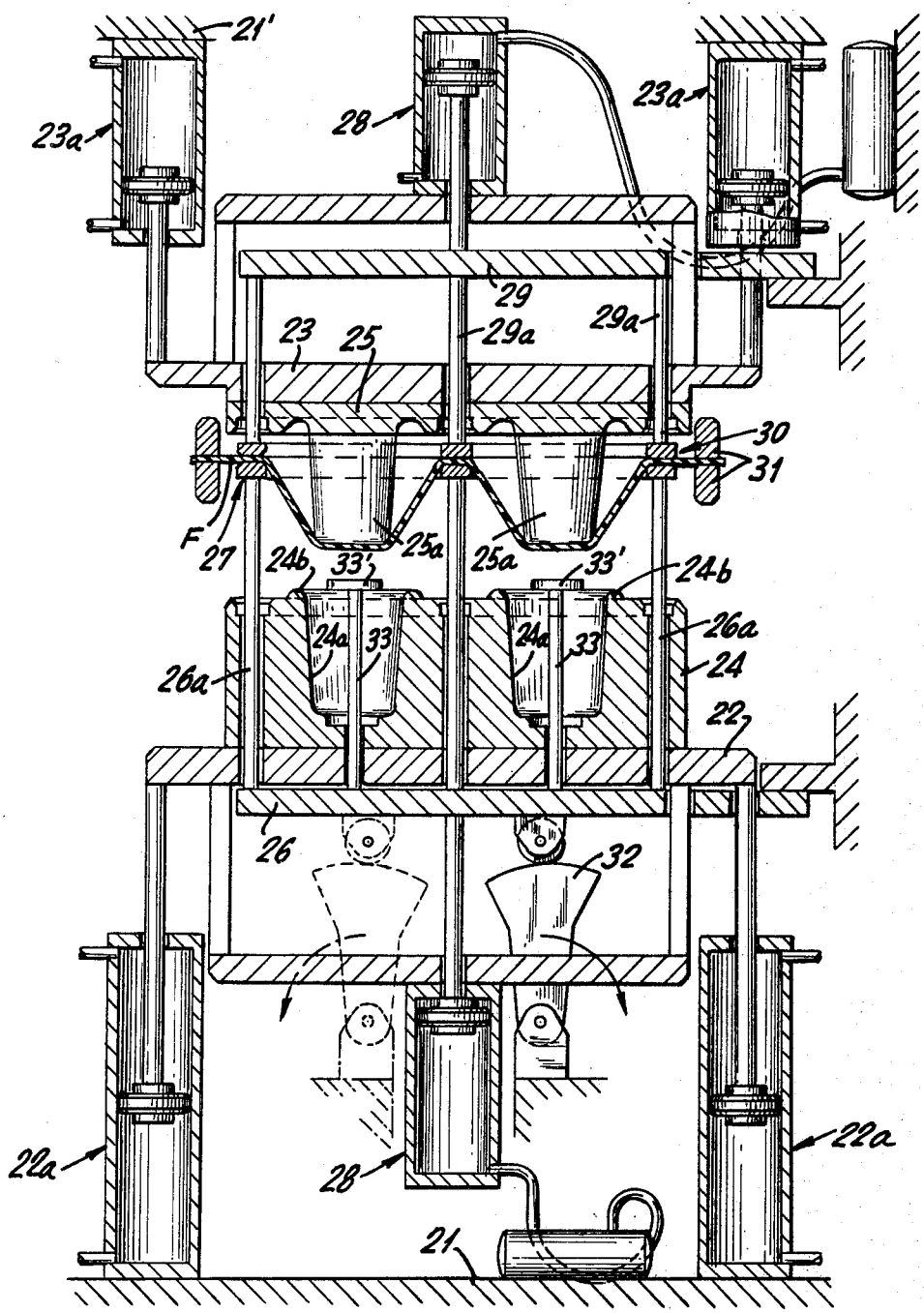
FIG. 4 is a view similar to FIG. 3, with the parts indicated in the intermediate positions of operation.

As indicated in FIG. 4, there is shown equipment which is similar to that of FIG. 3. A lower tool table 22 with a drive mechanism 22a and an upper tool table 23 with a drive mechanism 23a are fixed to frames 21 and 21', respectively. The lower tool table 22 carries a multiple cavity mold 24 with cavities 24a having an elevated rim 24b. Instead of individual punches, a multiple punch plate 25 with drawing punches 25a matching the cavity 24a is provided at the upper tool table 23. Both the hollow mold 24 and the drawing punches 25a have an approprate swage or grill plate 27 and 30, respectively, assigned to them. The lower grill plate 27 is carried on a carrying plate 26 by means of rods 26a which extend through openings in the hollow mold member 24. The carrying plate 26 is supported on a pneumatic drive mechanism 28 which permits the grill to move vertically independently of the tool table 22. The upper grill 30 is mounted on a carrying plate 29 on carrying rods 29a which extend through the upper tool table 23. The upper grill plate 30 is vertically movable independently of the upper tool table in response to a pneumatic drive mechanism 28 attached to the carrying plate 29.

Outside of the effective area of the two grill plates 27 and 30 a usual clamping frame 31 for the foil F is provided which, however, is not absolutely essential. Cooperating with the lower grill 27 is a pivoted supporting cam 32 which assures that the lower grill will be maintained in the upper position when the mold 24 is lowered.

In the embodiment indicated in FIG. 4 there is provided an ejector member 33 having a formation 33' which forms the bottom of the cavity 24a and which will act as an ejector when the mold member 24 is lowered relative to the table 26.

The device indicated in FIG. 4 operates similar to that of the embodiment of FIG. 3. After the two grill plates 27 and 30 have been moved toward each other until they contact the foil F, the upper tool table 23 is lowered by an amount to cause the drawing of the foil as indicated. The foil may thus be drawn from locations spaced outwardly from the rims of the cavities 24a to isure a more uniform drawing over the entire circumference of the container to be formed. Following the drawing, the hollow mold 24 is raised and the punch 25 is permitted to enter the cavities to form the completed container which is the embodiment illustrated is provided with an elevated rim. During the subsequent removal from the mold, the tool tables 22 and 23 are first moved apart while the grill plates 27 and 30 continue to hold the foil. The container bottom 33 thereby acts as an ejector to direct the finished container out of the cavity. The grill plates 27 and 30 also act as puller so that an uniform ejection of the container is possible.

In the embodiment illustrated in FIG. 4, a grill is assigned to both the lower and upper tool table. In the embodiment indicated in FIG. 5b, a grill is assigned only to the hollow mold 44, but not to the upper tool 45 having the punch 45a. The grill 47 is carried on a plate 46 on supporting rods 46a which extend upwardly through bores defined in the hollow mold 44. This design of the apparatus permits a so-called build up of pressure or balloon effect to be utilized in forming the foil. Venting or suction channels 50 of corresponding valves 51 are thereby provided to connect the cavity 44a in the known manner. The gap remaining between the punch 45a and the wall of the cavity is dimensioned so that there will be a very close clearance. If the grill 47 is advanced to the plane of the foil F while the hollow mold 44 remains lowered and the punch 45a is moved downwardly, as shown in FIG. 5b, then a build up of pressure develops in the cavity as soon as the punch enters it as long as the valves 51 still causes the throttling effect. This build up of pressure causes the foil material between the punch 45a and the holding ring 47 to be blown upwardly somewhat as it is evident from FIG. 5b. The consequence thereof is a full seating of the drawn foil portion against the punch. Therefore, the drawing of the foil is governed by the friction between the foil and the punch only because the foil makes contact with the rim portion of the hollow mold surrounding the cavity 44a only very late, that is, only immediately prior to the completion of the molding process. The consequence of this contact is the blocking off of the molding process immediately as in the case when the usual equipment without the grill is employed as indicated in FIG. 5a. In such a case, insufficient material flows into the contain wall will not be possible and the rim of the container which is formed will come out too thick.

Figure 6A:
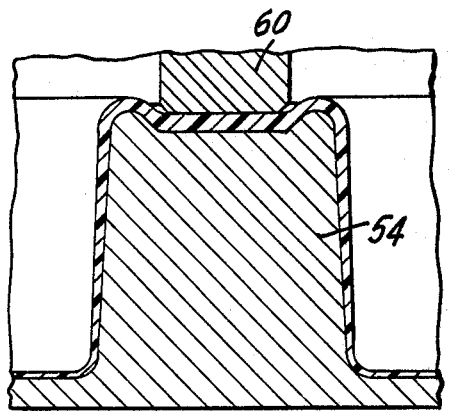
Figure 7A:
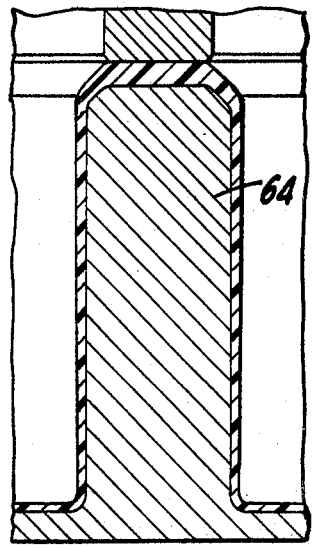
Figure 6B:
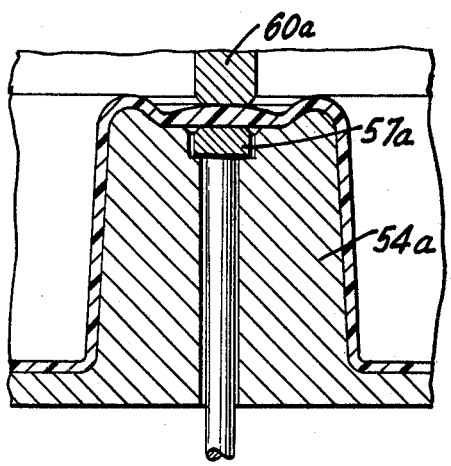

In FIGS. 6a and 6b and 7a and 7b there are indicated two other applications which are analogous to that indicated in FIG. 4. FIGS 6a and 7a indicate the material flow in the prior art devices whereas FIGS. 6b and 7b indicate the material flow in accordance with the invention. In the usual molding process indicated in FIG. 6a wherein the hollow mold 54 must be brought into the same plane as the foil and thus with the fixed box 60 before the punch enters the cavity a large rim area of the foil will remain drawn and the early contact of the foil with the hollow mold makes sufficient material flow into the container wall impossible leading to a greatly varying wall thickness. This is especially true when the container is provided with an elevated rim. When the grill 57, according to the invention, is used as indicated in FIG. 6b, then the foil can be retained as mentioned between the grill plate 57a and the holding plate 60a of the fixed box before the mold member 54a is moved upwardly. The material flow from the rim portion of the foil is therefore unobstructed as long as this rim portion is not in contact with the mold member 54a. This provides for uniform drawing and hence uniform wall thickness of the container.

Figure 7B:
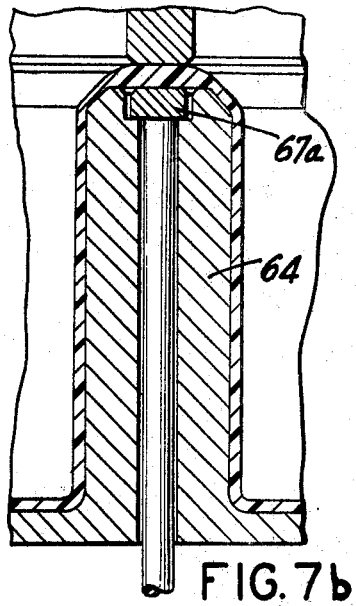

As a comparison of FIGS. 7a and 7b indicate, the same applies also to the productions of containers with countersunk rims. Here again, the early contact of the foil with the rim of the cavities of the hollow mold 65, as indicated in FIG. 7a, causes insufficient material to flow into the contain wall to be produced. The consequences are irregular wall thickness of the container and much waste of material. However, if the holding ring 67a is provided, as shown in FIG. 7b, which can be moved into its working position independently or prior to the hollow mold 64 is employed, then the material will flow more easily into the cavity and the wall thickness of the container which is formed will be more uniform.

Thus, by using the swage or grill plates it is not only possible to improve the uniform drawing of the material into the mold but also the molding process itself can be improved by the described predrawing while the hollow mold has not yet been lifted up to the plane of the foil. The grill plates which are used in conjunction with suitable ejectors make it possible to provide easy ejection of the molded product from the mold. The grill plates support the foil primarily at the beginning of the molding process, that is, as long as no substantial sealing pressure is yet required at the edge of the foil. The effective area of the grill plate and its contact pressure against the foil can therefore be kept relatively small. The grill plates merely have to compensate for the mechanical pull produced on the foil by the predrawing punch and not for the full pull generated by vacuum or compressed air during the final molding phase.

What is claimed is:

1. A device for forming hollow bodies from material such as synthetic thermoplastic foil comprising a mold member having at least one mold cavity, a grill plate having an opening aligned with the opening of said mold cavity but being of a larger dimension than the cavity, a punch disposed in alignment with said cavity being movable into and out of said cavity, means for locating a foil material to be formed into a hollow body over said grill plate and said mold member, clamping means exteriorly of said grill plate for clamping said foil, baking means associated with said grill plate and acting to contact and compress said foil at a location over said grill plate and between said clamping means and the mold cavity and to deform foil material moving over said grill plate and to reduce its thickness as said punch draws said foil into said cavity, and means for moving said mold member and said punch relatively to cause drawing of said foil material over said grill plate and to direct it into said cavity to form it into a hollow body.

2. A device, according to claim 1, including means mounting said mold member for movement toward and away from the plane of said foil material, and means mounting said punch for movement toward and away from the plane of said foil material, said grill plate being movable independently of said mold member and said punch.

3. A device, according to claim 2, including means for holding said mold member in engagement with the foil as said punch and said mold member are moved relatively to cause said punch member to enter said cavity.

4. A device, according to claim 1, including a carrying plate holding said grill plate, and a cam member adapted to move against said carrying plate to cause said grill plate to be urged against the foil while said punch and said mold member are moved relatively apart to cause separation of the hollow body from the mold.

5. A device, according to claim 1, wherein said mold member includes an ejector member forming the bottom of said cavity and movable upwardly and downwardly in said cavity, said ejector member being movable in said cavity upon relative movement of said mold member and said punch and acting to cause ejection of a hollow body formed in the cavity when said punch is moved out of the cavity.

6. A device, according to claim 1, said baking means including a fixed box having an opening corresponding to the opening of said grill plate and overlying said grill plate on the opposite side of the foil material, said punch member being mounted to move upwardly and downwardly in the area within said box over the foil material, said mold member being mounted for movement toward and away from the plane of the foil material, said clamp means for said foil material including drawing frame members engageable with the foil and the exterior of said box, and means for holding said mold member against said box after said punch is directed into said cavity to form the hollow body and during the removal of said punch from said hollow body by relative withdrawing movement of said punch and said mold member to cause ejection of the hollow body from the cavity.

7. A device, according to claim 1, wherein said means for moving said mold member and said punch relatively include means for moving each of said mold member and said punch separately in directions toward and away from each other, said punch being movable through the plane of the foil in which the foil material is held, said baking means including an additional grill plate disposed adjacent said punch and movable toward said foil material on the opposite side thereof from said grill plate, means for moving grill plate and said additional grill plates together to engage the foil material and to hold said foil material, said punch being movable through the plane of said foil material to draw said foil material before said punch is moved into the cavity of said mold member.

References Cited

UNITED STATES PATENTS

| | | | |
|---|---|---|---|
| Re. 23,171 | 11/1949 | Borkland | 18—19 XR |
| 3,105,270 | 10/1963 | Fibish | 18—19 |
| 3,167,104 | 1/1965 | Wiley et al. | 18—19 XR |
| 3,259,942 | 7/1966 | Politis | 18—19 |
| 3,341,893 | 9/1967 | Shelby | 18—19 |
| 3,341,894 | 9/1967 | Edwards | 18—19 |
| 1,760,288 | 5/1930 | Stevens. | |
| 2,270,187 | 1/1942 | Dulmage. | |
| 2,547,331 | 4/1951 | Lent. | |
| 3,182,482 | 5/1965 | Moller. | |

WILLIAM J. STEPHENSON, Primary Examiner

U.S. Cl. X.R.

72—350